No. 637,000. Patented Nov. 14, 1899.
H. JOHNSON.
JOINT FOR CONNECTING SECTIONS OF RODS.
(Application filed Dec. 22, 1898. Renewed Oct. 13, 1899.)

(No Model.)

Witnesses:—
M. E. Fletcher
Fred T. Haynes

Inventor:—
Henry Johnson
by attorneys
Brown & Seward

THE NORRIS PETERS CO., PHOTO-LITHO., WASHINGTON, D. C.

UNITED STATES PATENT OFFICE.

HENRY JOHNSON, OF ARLINGTON, NEW JERSEY, ASSIGNOR TO THE STANDARD RAILROAD SIGNAL COMPANY, OF SAME PLACE.

JOINT FOR CONNECTING SECTIONS OF RODS.

SPECIFICATION forming part of Letters Patent No. 637,000, dated November 14, 1899.

Application filed December 22, 1898. Renewed October 13, 1899. Serial No. 733,534. (No model.)

*To all whom it may concern:*

Be it known that I, HENRY JOHNSON, a citizen of the United States, and a resident of Arlington, in the county of Hudson and State of New Jersey, have invented a new and useful Joint for Connecting Sections of Rods, of which the following is a specification.

My invention relates to a joint for connecting sections of rods, and more particularly to a joint for connecting tubular or pipe sections, which are commonly employed in connection with switch and signal actuating mechanism.

A practical embodiment of my invention is represented in the accompanying drawings, in which—

Figure 1:
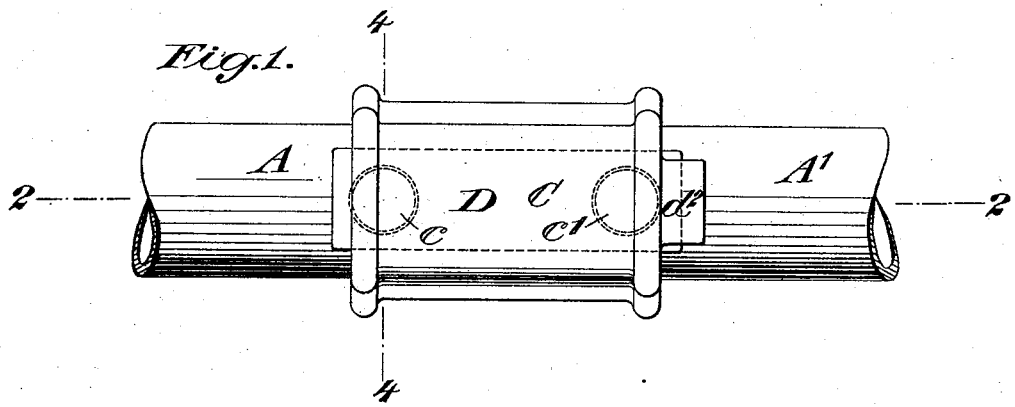
Figure 2:
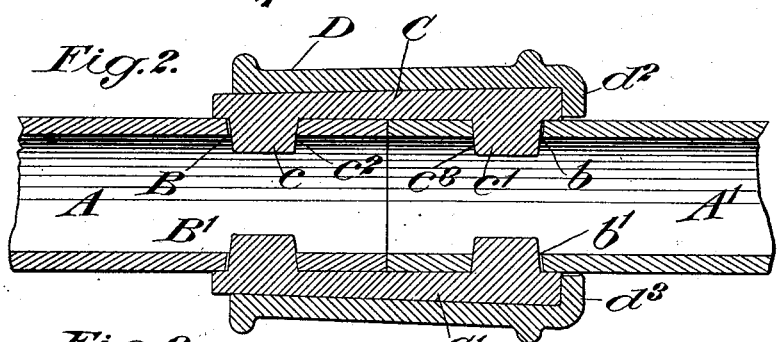
Figure 3:
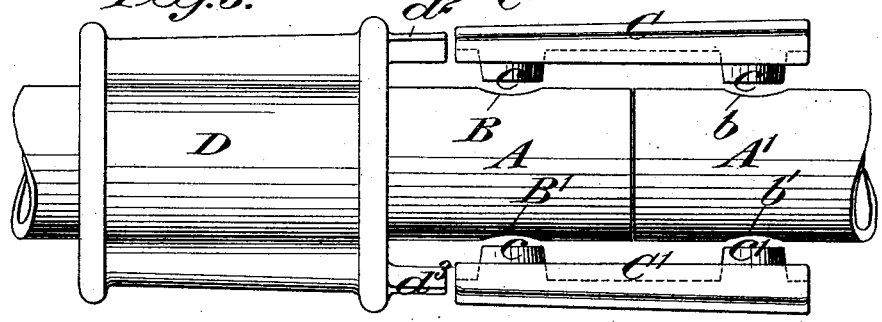

Figure 1 is a plan view showing the joint in position in connection with two adjacent sections of pipe. Fig. 2 is a longitudinal section along the plane of line 2 2 of Fig. 1. Fig. 3 shows the position of the parts before they are assembled, and Fig. 4 is a transverse section along line 4 4 of Fig. 1.

A A' represent two consecutive sections of a rod, the sections being shown in the present instance as tubular or pipe sections. Each of the sections A A' is provided with a pair of perforations, the perforations in the section A being denoted by B B' and those in the section A' by $b$ $b'$. The members of each pair of perforations are arranged in the present instance diametrically opposite one another and a short distance from the end of the section through the wall of which they extend.

Keys, one denoted as a whole by C and the other as a whole by C', have projecting from one of their faces lugs $c$ $c'$, so spaced as to enter simultaneously one of the pair of perforations in the section A—for example, the perforation B—and one of the pair of perforations in the section A'—for example, $b$. The lugs $c$ $c'$ have their faces toward the adjacent ends of the sections to be united beveled, as shown at $c^2$ $c^3$, so that as they are crowded inwardly toward the center of the sections to be united they will have a tendency to crowd the ends of the two sections into close contact with each other. The lugs $c$ $c'$ may be made in the shape of frustums of cones; but whatever be their particular shape it is desirable that their adjacent faces have a drawing action upon the adjacent walls of the perforations B $b$, through which they enter. It is obvious in this connection that the adjacent walls of the perforations B $b$ might be made slanting and the walls of the keys straight, such structure being merely a reversal of parts so far as the function is concerned.

Figure 4:
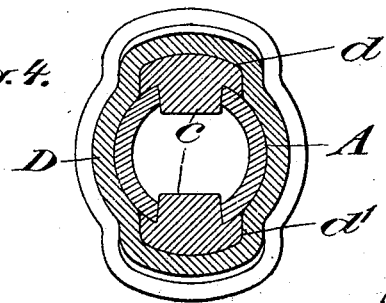

I prefer to make the keys somewhat wider than the diameter of the perforations, as clearly shown in Figs. 1 and 4, and to shape their inner faces to conform to the exterior of the sections A A'. The body of the keys C C' is made slightly tapering, its thickness gradually increasing from one end to the other to conform to the interior of the locking-sleeve D.

The locking-sleeve D intermediate of the positions which the keys C C' are intended to occupy is made to conform quite closely to the exterior of the sections A A' to be united, and where the keys are to engage the sleeve the latter is provided with chambers $d$ $d'$, preferably shaped to conform to the cross-section of the keys and having a taper substantially corresponding to the taper of the keys C C'. The chambers $d$ $d'$ are made to closely embrace the outer faces of the keys when the sleeve itself is driven home, and after the keys are placed in their positions, as shown in Fig. 2, and the sleeve has been slipped over their thinner ends the further advance of the sleeve along the keys will tend to force the keys snugly into contact with the opposite sides of the tube or pipe sections, thereby forcing the ends of the two sections into close contact, and, finally, when the sleeve has been forced on to its limit it may be locked in its position by bending tongues $d^2$ $d^3$, projecting from the end of the sleeve, over the thicker ends of the keys, as clearly shown in Fig. 2.

It is obvious that the number of keys may be varied to suit the requirements without departing from the spirit and scope of my invention and that the perforations B B' $b$ $b'$ may be of any suitable size and shape in cross-section provided only that they be large enough to permit the free entrance of the lugs on the keys, the engagement of the adjacent walls of the perforations with the adjacent walls of the lugs being a feature of marked advantage, but not absolutely necessary to the effectiveness of the joint.

What I claim is—

1. The combination with adjacent sections of a rod provided with perforations in their walls, of one or more keys provided with lugs adapted to enter the perforations in the different sections and a sleeve adapted to embrace the adjacent ends of the sections and the key or keys, the said sleeve and keys having a wedge-like engagement with one another, the sleeve being provided with tongues for locking the parts in assembled adjustment, substantially as set forth.

2. The combination with adjacent sections of a rod provided with perforations near their ends, of one or more keys provided with lugs adapted to engage the perforations in the different sections, the body of the key being arranged to bridge the joint between the sections and the adjacent faces of the said lugs having a wedge-like engagement with the adjacent walls of the perforations in the different sections, and a locking-sleeve adapted to embrace the ends of the pipe-sections and the key or keys, the said sleeve having a wedge-like engagement with the said key or keys for forcing the parts into assembled adjustment, substantially as set forth.

In testimony that I claim the foregoing as my invention I have signed my name, in presence of two witnesses, this 16th day of September, 1898.

HENRY JOHNSON.

Witnesses:
FREDK. HAYNES,
C. S. SUNDGREN.